(12) United States Patent
Kim (10) Patent No.: US 8,149,452 B2
(45) Date of Patent: Apr. 3, 2012

(54) METHOD OF PRINTING IMAGE AND PHOTO-PRINTING SYSTEM USING THE METHOD

(75) Inventor: Won-jung Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 863 days.

(21) Appl. No.: 12/221,696

(22) Filed: Aug. 6, 2008

(65) Prior Publication Data

US 2009/0046304 A1 Feb. 19, 2009

(30) Foreign Application Priority Data

Aug. 17, 2007 (KR) .................. 10-2007-0083001

(51) Int. Cl.
*G06K 15/00* (2006.01)
*H04N 5/225* (2006.01)

(52) U.S. Cl. .................... 358/1.18; 348/207.2
(58) Field of Classification Search .............. 358/1.18, 358/451, 454, 1.2, 1.9; 348/207.2
See application file for complete search history.

(56) References Cited

U.S. PATENT DOCUMENTS

| | | | |
|---|---|---|---|
| 6,831,683 B2 * | 12/2004 | Ogiwara | ............ 348/207.2 |
| 2003/0095160 A1 | 5/2003 | Ogiwara | |
| 2004/0252340 A1 | 12/2004 | Komagamine et al. | |
| 2005/0088694 A1 * | 4/2005 | Ogiwara | ............ 358/1.18 |
| 2005/0099497 A1 | 5/2005 | Rogan et al. | |
| 2006/0176531 A1 * | 8/2006 | Sawada | ............ 358/528 |
| 2007/0188774 A1 * | 8/2007 | Yudasaka et al. | ............ 358/1.2 |
| 2008/0043255 A1 | 2/2008 | Wada | |
| 2008/0165390 A1 * | 7/2008 | Kim | ............ 358/451 |
| 2009/0310814 A1 * | 12/2009 | Gallagher et al. | ............ 382/100 |

FOREIGN PATENT DOCUMENTS

| | | |
|---|---|---|
| CN | 1422070 A | 6/2003 |
| JP | 2004-220327 A | 8/2004 |

OTHER PUBLICATIONS

Office Action established for CN 200810210438.7 (Dec. 31, 2011).

* cited by examiner

*Primary Examiner* — Jerome Grant, II
(74) *Attorney, Agent, or Firm* — Drinker Biddle & Reath LLP (57) ABSTRACT

Methods of printing an image and photo-printing systems using the methods are provided. The methods involve receiving the image from a data storage device and printing the image via a printer, the method including the operations of determining whether a Paper Full printing option in which no space is left on a printing material is selected; when the Paper Full printing option is selected, comparing a ratio of an image to be printed with a ratio of a currently set printing material; and when the ratios of the image and the printing material are different from each other, displaying a print area of the image to be printed on a display panel.

The methods of printing the image and photo-printing systems using the methods provide users with an opportunity to check and re-set a print area prior to printing the image, thereby preventing an important part of the image from being cropped due to mismatch between ratios of the image to be printed and the printing material.

26 Claims, 8 Drawing Sheets

METHOD OF PRINTING IMAGE AND PHOTO-PRINTING SYSTEM USING THE METHOD

CROSS-REFERENCE TO RELATED PATENT APPLICATION

This application claims the benefit of Korean Patent Application No. 10-2007-0083001, filed on Aug. 17, 2007, in the Korean Intellectual Property Office, the disclosure of which is incorporated herein in its entirety by reference.

BACKGROUND OF THE INVENTION

1. Field of the Invention

The present invention relates to a method and system for printing an image. By providing users with a graphic environment for checking and re-setting a print area prior to printing the image, the method and system prevent the cropping of an important part of the image when there is a mismatch between an aspect ratio of the image and an aspect ratio of the printing material.

2. Description of the Related Art

At present, digital cameras, personal computers, and the like generally print images having an aspect ratio of 4:3. Due to users' preferences, the number of ratios seems to have gradually increased to include additional ratios, such as, e.g., 3:2 and 16:9 (wide screen). Meanwhile, photo printers for printing photo images taken by cameras have been commercialized. Such photo printers apply printing technologies such as ink jet methods, dye sublimation transfer methods, and direct thermal methods. Such photo printers typically support a printing material having an aspect ratio of 3:2. As a result, when an image having an aspect ratio of 4:3, e.g., an image captured by a digital camera or the like, is printed on the printing material having the ratio of 3:2, portions of the image are cropped or big spaces occur near the edges of the printing material due to the mismatch between the image and the printing material. The spaces near the edges of the printing material are the result of adding horizontal and/or vertical mattes to the image, thereby creating a letterbox, pillarbox, or windowbox.

Meanwhile, options for printing an image on a printing material are widely divided into two types. One is an "Image Full printing" option, and the other is a "Paper Full printing" option. In the Image Full printing option, an image is printed such that the image is not cropped but the edges of a printing material have spaces. Meanwhile, in the Paper Full printing option, the image is printed on the entirety of the printing material, i.e., leaving no spaces. However, in the Paper Full printing option, edges of an image may be partly cropped. In particular, due to the aforementioned mismatch of the ratios of the image and the printing material, much image information from the top and bottom or the left and right ends of an image is unavoidably cropped.

Figure 1:
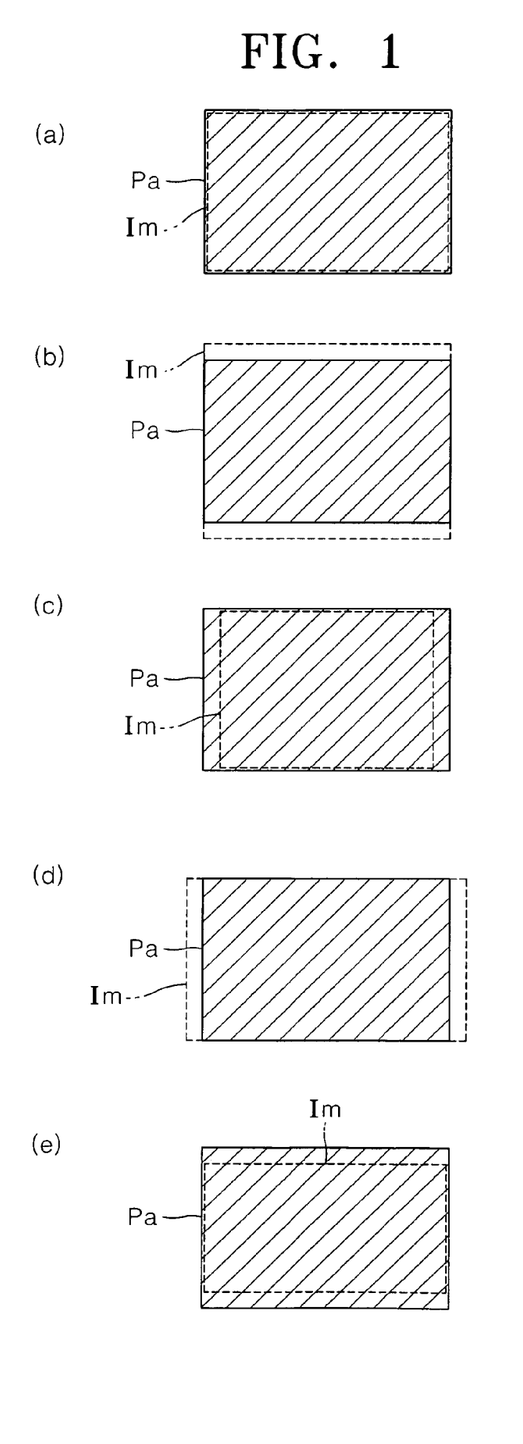
FIG. 1 illustrates examples (a) through (e) for describing a problem which occurs due to difference between ratios of an image and a printing material.

FIG. 1 includes examples (a) through (e) illustrating various ratios of images and printing materials. In addition, the ratios of the images and printing materials illustrated in FIG. 1 are shown in Table 1 below. In Table 1, the reference Im indicates an image and the reference Pa indicates a printing material. When a Paper Full printing option is selected, the images will be printed on the printing material according to ratios of the image and printing material as discussed below.

TABLE 1

| Classification | Printing material ratio vs. Image ratio (example) | Display manner |
| --- | --- | --- |
| In a case of (a) in FIG. 1 | Pa = Im | Match width/height |
| In a case of (b) in FIG. 1 | Pa > Im (Pa = 3:2/Im = 4:3) | Match width |
| In a case of (c) in FIG. 1 | Pa > Im (Pa = 3:2/Im = 4:3) | Match height |
| In a case of (d) in FIG. 1 | Pa < Im (Pa = 3:2/Im = 16:9) | Match height |
| In a case of (e) in FIG. 1 | Pa < Im (Pa = 3:2/Im = 16:9) | Match width |

As shown in FIG. 1 and Table 1, when the ratios of the image and printing material match with each other, the printed image is not cropped and no spaces remain near the edges of the printing material. However, in general, the image Im has an aspect ratio of 4:3, and the printing material Pa has an aspect ratio of 3:2. When the ratios are mismatched in this manner, a part of the image Im is cropped and an unintentional border is made on the printing material Pa. The portion of image Im which is cropped and the portion of the printing material Pa which contains the unintentional border depends upon whether (1) left-right edges of the image Im and printing material Pa are mutually matched in a width direction as illustrated in FIG. 1(b) or (2) top-bottom edges of the image Im and printing material Pa are mutually matched in a height direction as illustrated in of FIG. 1(c). In such cases, when a part of the image is excluded from a print area, users are obliged to print a cropped image without receiving any prior indication and without an opportunity to select the print area. In particular, when a part of the image that is considered important by a user, for example a part of an image including a person, is cropped in the printed image, users are less satisfied with the printed image, and the operation of printing the image becomes meaningless.

SUMMARY OF THE INVENTION

Various embodiments of the present invention provide methods of printing an image and photo-printing systems using the methods. The methods and systems can provide users with a graphic environment for checking and re-setting a print area prior to printing the image. As a result, the methods and systems prevent an important part of the image from being cropped due to mismatch between ratios of the image to be printed and a printing material.

According to an embodiment of the present invention, there is provided a method of printing an image by receiving the image from a data storage device and printing the image via a photo printer, the method including the operations of (a) determining whether a Paper Full printing option in which a space is not to be left on a printing material is selected; (b) when the Paper Full printing option is selected, comparing an aspect ratio of an image to be printed with an aspect ratio of a currently set printing material; and (c) when the ratios of the image and the printing material are different from each other, displaying a print area on the image to be printed.

After the operation of (c), the method may further include the operation of waiting to receive a user's approval of the print area.

In an embodiment, the operation of (c) may include the operations of calculating location information regarding a currently set print area, and based on the calculated location information, displaying the print area on a display panel.

The location information regarding the print area may include at least one piece of location information regarding a top edge, a bottom edge, a left edge, and a right edge of the print area.

The location information regarding the print area may include a coordinate value for a location of a start point of the currently set print area and coordinate values for a width and height of the print area calculated from the start point.

After the operation of (c), the method may further include the operation of (d) updating a new print area according to a user input signal related to movement of a print area, and displaying the new print area.

After the operation of (d), the method may further include the operation of (e) performing a print operation when it receives a final print command input by a user.

According to another embodiment of the present invention, there is provided a photo-printing system including a data storage device storing an image; and a photo printer receiving data related to the image from the data storage device, and printing the image on a printing material. The photo printer includes a communication control unit for data communication with the data storage device; a print area calculation unit for calculating location information of a currently set print area, according to a request of the data storage device. The data storage device includes a communication control unit for data communication with the photo printer; a comparison and determination unit for comparing an aspect ratio of the printing material with an aspect ratio of an image to be printed and determining whether or not the ratios match each other; and a processing unit for generating a signal to display a print area calculated by the print area calculation unit on the image to be printed when it is determined by the comparison and determination unit that the ratios do not match each other.

The processing unit may display the print area on the image to be printed and then wait for receipt of a user's approval of the print area.

The print area calculation unit may update location information of a print area according to a user input signal related to movement of the print area, and the processing unit may display a new print area on the image to be printed on a display panel, wherein the new print area is formed based on the updated location information.

The data storage device may further include an image data storage unit for storing image data as a print target, and the photo printer may further comprise a print data storage unit for storing data related to an image received from the data storage device prior to printing the image on a printing material according to a final print command.

A communication link may exist for performing data communication between the data storage device and the photo printer.

The data storage device and the photo printer may be mutually connected via an Internet communication network.

The data storage device may be any conventional image storage device. For example, the data storage device may be a digital camera, a computer, a mobile telephone, or a digital television (TV).

According to another embodiment of the present invention, there is provided a photo-printing system including a data storage device storing an image; and a photo printer receiving data related to the image from the data storage device, and printing the image on a printing material. The photo printer includes a communication control unit for data communication with the data storage device; a comparison and determination unit comparing an aspect ratio of the printing material with an aspect ratio of an image to be printed and determining whether or not the ratios match each other; a print area calculation unit calculating location information on a print area based on a current setting; a printer processor for generating a signal to display a print area calculated by the print area calculation unit on the image to be printed when it is determined by the comparison and determination unit that the ratios do not match each other; and a print data storage unit for storing data related to an image received from the data storage device before printing the image on a printing material, according to a final print command.

The printer processor may display the print area on the image to be printed and then wait for receipt of a user's approval of the print area.

The data storage device may include a communication control unit for data communication with the photo printer and a memory unit storing image data.

The print area calculation unit may update location information of a print area according to a user input signal related to movement of the print area, and the printer processor may display a new print area on a display panel, wherein the new print area is based on the updated location information.

The data storage device may be a detachable memory device.

The data storage device and the photo printer may be mutually connected via an Internet communication network.

According to another embodiment of the present invention, there is provided a photo-printing system including a data storage device storing an image; and a photo printer receiving data related to the image from the data storage device, and printing the image on a printing material. The data storage device includes a communication control unit for data communication with the photo printer; a comparison and determination unit for comparing an aspect ratio of the printing material with an aspect ratio of an image to be printed and determining whether or not the ratios match each other; a print area calculation unit calculating location information on a currently set print area; and a processing unit for generating a signal to display a print area calculated by the print area calculation unit on the image to be printed when it is determined by the comparison and determination unit that the ratios do not match each other.

The photo printer may include a communication control unit for data communication with the data storage device; and a print data storage unit for storing data related to an image received from the data storage device before printing the image on a printing material, according to a final print command.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE EMBODIMENTS

Various embodiments of a method for printing an image and photo-printing systems using the method will now be described more fully with reference to the accompanying drawings, in which exemplary embodiments of the invention are shown.

Figure 2:
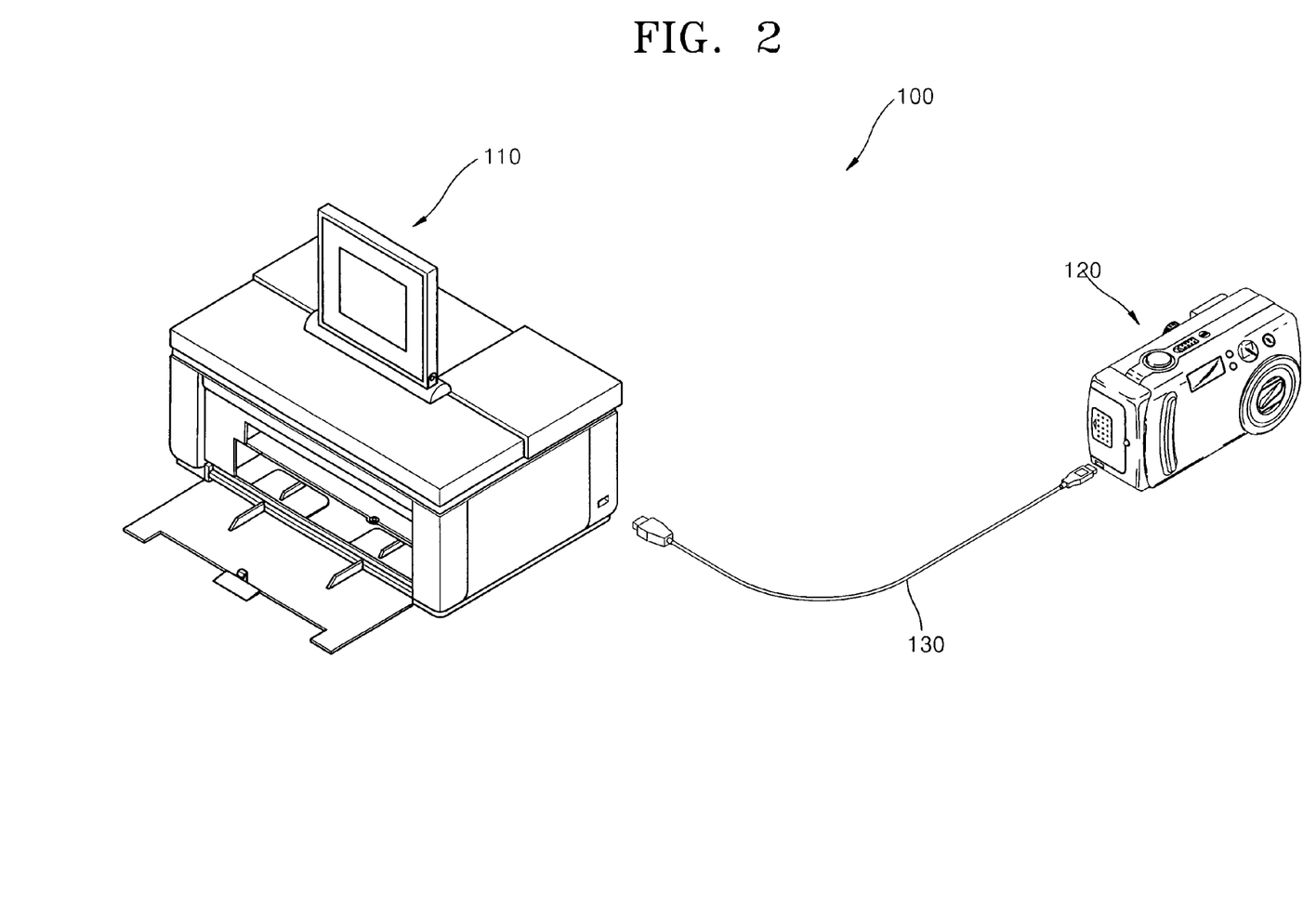
FIG. 2 is a perspective view of a photo-printing system, according to an embodiment of the present invention.

FIG. 2 is a perspective view of a photo-printing system 100, according to an embodiment of the present invention.

Figure 3:
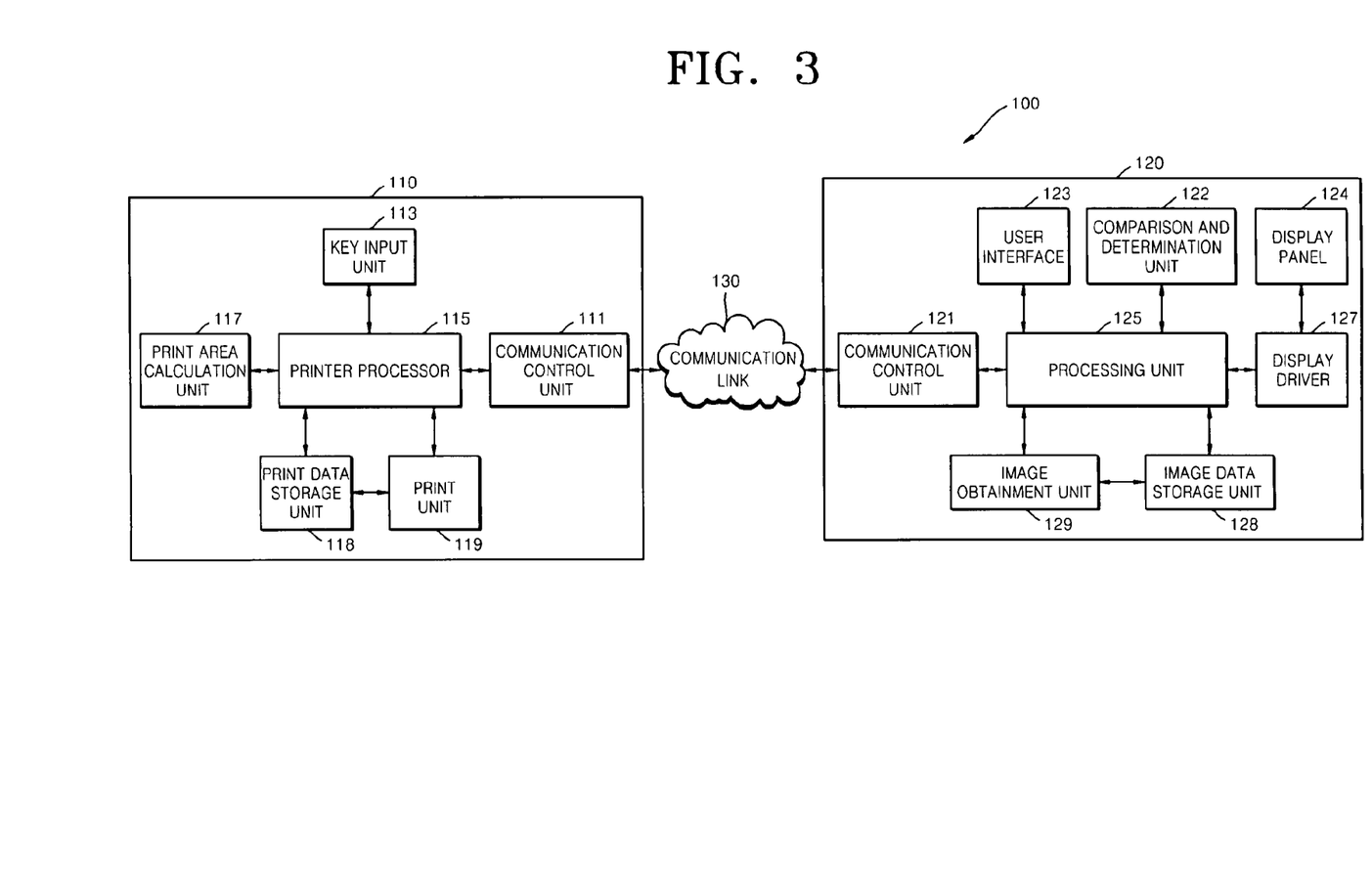
FIG. 3 is a block diagram illustrating an example functional structure of the photo-printing system illustrated in FIG. 2.

As illustrated in FIG. 2, the photo-printing system 100 according to the present invention includes a photo printer 110 as a print and output apparatus, and a data storage device 120 for storing images to be printed. Although the data storage device 120 shown in FIG. 3 is a digital camera, the data storage device 120 may be any conventional image storage device. For example, the data storage device may be a mobile telephone, a computer, or a digital television (TV). For mutual communication, the photo printer 110 and the data storage device 120 are mutually connected via a communication link 130. The communication link 130 performs data communication between the photo printer 110 and the data storage device 120. The communication link may be any type of conventional communication link such as, for example, a Universal Serial Bus (USB) cable. Alternatively, wireless connections such as Bluetooth, Wi-Fi, and wireless local area network (LAN) may be used for communication between the photo printer 110 and the data storage device 120, in which case a separate communication link 130 may be unnecessary. In addition, the communication link 130 may be formed using a communication network such as the Internet, and the like, and the photo printer 110 and data storage device 120 may exchange data via the communication network.

FIG. 3 is a block diagram illustrating an example functional structure of the photo printer 110 and the data storage device 120 illustrated in FIG. 2. Referring to FIG. 3, the photo printer 110 includes a communication control unit 111, a print data storage unit 118, a print unit 119, a print area calculation unit 117, a key input unit 113, and a printer processor 115. The printer processor 115 may comprise a central processing unit (CPU) or the like for controlling the units of the photo printer 110. The communication control unit 111 initializes and controls a communication setting with the data storage device 120. For example, in a print mode, the communication control unit 111 intermediates between the photo printer 110 and the data storage device 120 regarding an exchange of a control command, a delivery of print data, an exchange of a control command/data related to setting a print area, and the like. The photo printer 110 transmits information regarding a print area to the data storage device 120 via the communication control unit 111, thereby enabling the information to be displayed to users. Inversely, the photo printer 110 receives print data from the data storage device 120, and thereby prints the print data on a printing material.

The communication control unit 111 may provide, for example, a USB port, a card reader port, or a module for connecting to a communication network, as a communication interface that is to be connected with the data storage device 120. The communication control unit 111 may have installed therein a USB device controller for a USB connection and/or a wireless communication module for wireless communication.

Meanwhile, the print data storage unit 118 temporarily stores print data received from the data storage device 120 and transmits the print data stored therein to the print unit 119 according to the progress of a print operation, thereby performing a buffering role. The print data storage unit 118 may be embodied as a temporary memory device for temporarily storing received print data, such as a Dynamic Random Access Memory (DRAM), or the like.

The print unit 119 performs a reserved print operation existing in the print data storage unit 118 according to a print command. The print unit 119 may be embodied as any conventional photo printing unit. For example, the print unit 119 may be a thermal transfer image forming mechanism which expresses a predetermined image by selectively heating coloring materials on a printing material, an electronic photo image forming mechanism which uses an electric potential difference of an electrostatic latent image formed on a photoconductive drum, an inkjet image forming mechanism which forms and ejects ink droplets on a printing material, or other appropriate mechanisms.

The key input unit 113 generates a predetermined command in response to user manipulation and provides the printer processor 115 with the generated command. The key input unit 113 may include, for example, a power button for turning on/off the power of the photo printer 110, a print stop key for stopping a print operation, a setting mode conversion key for setting print conditions.

The print area calculation unit 117 generates print area data including ratio/location information on a print area based on a current setting and can thereby provide a preview function. For example, the generated print area data is transmitted to the data storage device 120 via the communication control unit 111. Based on the received print area data, when the data storage device 120 has a display function, the data storage device 120 may display a print area on an image to be printed, with a dotted line or a shadow, and can thereby be capable of providing to users in advance of printing the information that a specific area is excluded from a printing operation. The print area may be represented, for example, as a form of a rectangle frame on the image.

The print area calculation unit 117 continuously provides location information on a new print area, in correspondence to receiving an updated user setting. For example, when a user manipulates a direction key button of a digital camera so as to include a part of an image important to the user in a print area without the important part being cropped, a movement command related to the print area is thereby generated. When the movement command is generated and received, the print area calculation unit 117 generates new print area data in correspondence to the movement command, and a new print area formed by the user manipulation is displayed. When location information for a print area is approved by a user, the location information becomes a part of the image's print conditions.

Turning to the data storage device 120 portion of FIG. 3, the data storage device 120 includes a user interface 123, an image data storage unit 128 for storing images, a display panel 124, a display driver 127 for controlling the display panel 124, a communication control unit 121, a comparison and determination unit 122, and a processing unit 125. The processing unit 125 comprises a CPU or the like for controlling the units of the data storage device 120. Besides these units, if the data storage device 120 is a digital camera as illustrated in FIGS. 2-3, the data storage device 120 includes an optical unit comprised of a plurality of optical lenses and an image obtainment unit 129 including a Charge Coupled Device (CCD), an Analog-to-Digital (A/D) converter, a driving circuit, a signal processing circuit, and the like which are for processing an output signal from the optical unit and through which an image that is converted to a digital format can be obtained. An image output from the image obtainment unit 129 is stored in the image data storage unit 128 that is embodied as a temporary memory device such as the DRAM or the like, or a secondary memory device such as a detachable flash Read-Only Memory (ROM) or the like.

The user interface 123 includes a plurality of manipulation buttons including, for example, a mode selection key for converting operation modes (such as a capturing mode, a reproducing mode, a print mode, and the like) of the data storage device 120, a four-direction function key for particularly directing movement of a print area, a selection-confirm key for selecting a menu item indicated by an activated cursor, and the like.

In a print mode, images stored in the image data storage unit 128 are called by the processing unit 125 so as to be selected by a user and displayed on the display panel 124. For example, a plurality of images stored in a user-selected folder may be displayed using a thumbnail form. A user may select an image to be printed, i.e., a print target, from among the displayed images, while moving the plurality of images matrix-arrayed in thumbnail form by using the four-direction function key and then pressing the selection-confirm key. At this time, the selection of the print target may be simultaneously performed for not only one image but also a plurality of different images.

Meanwhile, the data storage device 120 includes the communication control unit 121 for wireless/wired communication with the photo printer 110. In a print mode, the communication control unit 121 intermediates between the data storage device 120 and the photo printer 110 regarding an exchange of a control command, a delivery of print data, an exchange of control command/data related to setting a print area, and the like. The communication control unit 121 may have installed therein a USB device controller for controlling communication with the photo printer 110 via a USB and/or a wireless communication module for wireless communication.

The comparison and determination unit 122 compares a printing material ratio received from the photo printer 110 with an aspect ratio of an image to be a print target, and determines a relationship between the ratios. For example, when the ratios of the printing material and image are respectively 3:2 and 4:3, the comparison and determination unit 122 outputs a signal indicating that the ratios are different from each other. In response to this signal, the processing unit 125 generates a signal to display a print area on the image and thereby provides users with an opportunity to pre-adjust the print area. This will be more specifically described later.

Figure 4:
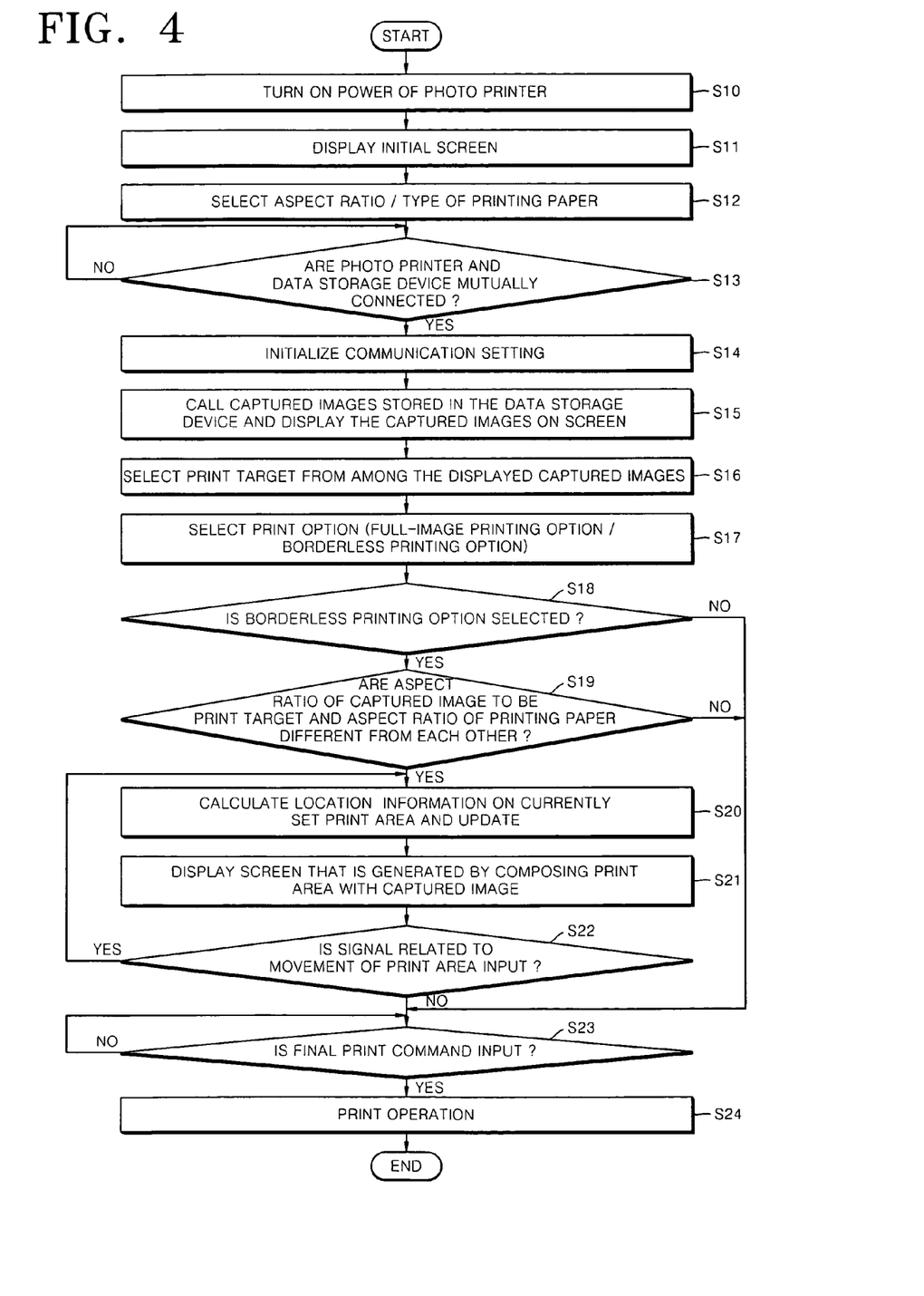
FIG. 4 is a flowchart illustrating a method of printing an image, according to an embodiment of the present invention.

FIG. 4 is a flowchart illustrating a method of printing an image, according to an embodiment of the present invention. FIG. 4 illustrates a method performed by the photo-printing system of FIG. 3, wherein the method comprises operations mainly performed by processing units of a printer processor and a data storage device.

First, when operation power is applied to a photo printer 110 (operation S10), a printer processor 115 is initialized and then enters a print standby mode. In the initialization stage, the printer processor 115 may output an initial screen display-ing an operation status of the current photo printer 110 on a display screen (operation S11).

When signals corresponding to a setting mode are received from a key input unit 113 of the photo printer 110, the printer processor 115 performs a user setting mode for setting print conditions according to the signals received from the key input unit 113 (operation S12). The printer processor 115 may display a setting menu screen on a display panel so that a user may input his setting selections. For example, a user may input a selection related to the size of a printing material, such as A3, A4, A5, or the like. The user also may input a selection relating to the type of a printing material, such as general plain paper, photo-dedicated papers, or the like. The user's selections may be input to the printer processor 115. The printer processor 115 may receive a user input related to selection as a print target of an image or a general document, if the printer processor 115 is part of a multi-function apparatus that supports outputs of images and general documents. If the printer processor 115 does not receive a user input signal relating to a setting mode, the printer processor 115 may automatically set print conditions according to a basic setting. If the printing processor 115 automatically sets print conditions, operation S12 related to receiving the user setting for print options as described above may be omitted.

Next, when connection from a data storage device 120 to a communication interface such as a USB port, a card reader port, or the like is detected (operation S13), a communication control unit 111 generates a communication standby signal. In correspondence to the generated communication standby signal, the printer processor 115 exchanges transmission control information with the data storage device 120 and initializes a communication setting (operation S14).

Meanwhile, the data storage device 120 connected with the photo printer 110 performs a print mode according to receipt of a user input signal, before and after connection with the photo printer 110. To be more specific, when a signal corresponding to a mode conversion is input to a user interface 123 of the data storage device 120 and received by a processing unit 125 of the data storage device 120, the processing unit 125 performs the mode conversion according to the input signal. In the print mode, a user's selection of images to print, i.e., print targets, from among a plurality of images stored in an image data storage unit 128 (operations S15 and S16) is input to the processing unit 125. Users may view the plurality of images stored in the image data storage unit 128 and select all or some of the plurality of images as the print target. For example, according to a user's selection, the processing unit 125 may call images from a specific folder stored in the image data storage unit 128 and display the images on a display panel 124 in a thumbnail form (operation S15). An activated cursor may displayed with the plurality of images displayed on the display panel 124. When an input signal related to a four-direction function key of the user interface 123 is detected, the processing unit 125 moves the activated cursor according to the input signal and awaits receipt of a user selection signal. A user may select a print target by manipulating a selection-confirm key of the user interface 123, thereby generating a print target selection signal. When the processing unit 125 receives the print target selection signal (operation S16), the processing unit 125 prepares to transmit to the photo printer 110 data relating to an image corresponding to the print target.

Next, when signals corresponding to a setting mode are received from the user interface 123, a setting mode for setting print conditions according to the input signals is performed (operation S17). In the setting mode, the processing unit 125 of the data storage device 120 displays a setting menu screen on the display panel 124 and receives a user's selection of a print option. In particular, an option selection menu related to an Image Full printing option and a Paper Full printing option are displayed on the setting menu screen as print conditions, and if the user selects one of these options, the processing unit 125 receives a user print option selection signal.

When a user print option selection signal is received, the processing unit 125 of the data storage device 120 determines whether the user print option selection signal corresponds to the Paper Full printing option (operation S18), and as a result of the determination, performs subsequent procedures based on the determination. If the Image Full printing option is selected instead of the Paper Full printing option, however, operations S19-S22 are not performed. Instead, operation S 23 related to a print standby mode may be immediately performed, and a print operation is performed according to receipt of a user final print command (operation S24). Operations S23 and S24 will be discussed in more detail below.

When the Paper Full printing option is selected, a comparison and determination unit 122 retrieves information on an aspect ratio of an image selected as a print target, receives information on an aspect ratio of a currently set printing material from the photo printer 110, and compares the information on the ratios (operation S19). As a result of the comparison, when the ratios between the image and the printing material match with each other, operation S23 relating to the print standby mode may be performed, and the print operation is performed according to receipt of a user final print command (operation S24).

However, when the ratios between the image and the printing material are different from each other, for example, if the ratio of the image selected as the print target is 4:3 while the ratio of the printing material is 3:2 (which corresponds to a general A4 paper), operation S20 and operations following therefrom are to be performed. That is, the processing unit 125 of the data storage device 120 requests location information on a print area from the connected photo printer 110. In response to the request, the printer processor 115 operates a print area calculation unit 117, calculates the location information on the print area based on a current setting, and thereby generates print area data from the result of the calculation (operation S20). For example, the print area data may include location information on top, bottom, left, and right edges of the print area. For example, the location information on the print area may include coordinate values pX and pY for a location of a start point of the print area, and coordinate values pW and pH for a width and height of the print area calculated from the start point. The coordinate values pX, pY, pW, and pH may be based on a horizontal coordinate X and a vertical coordinate Y on a screen, wherein the horizontal and vertical coordinates X and Y are based on pixel arrangements.

Figure 5:
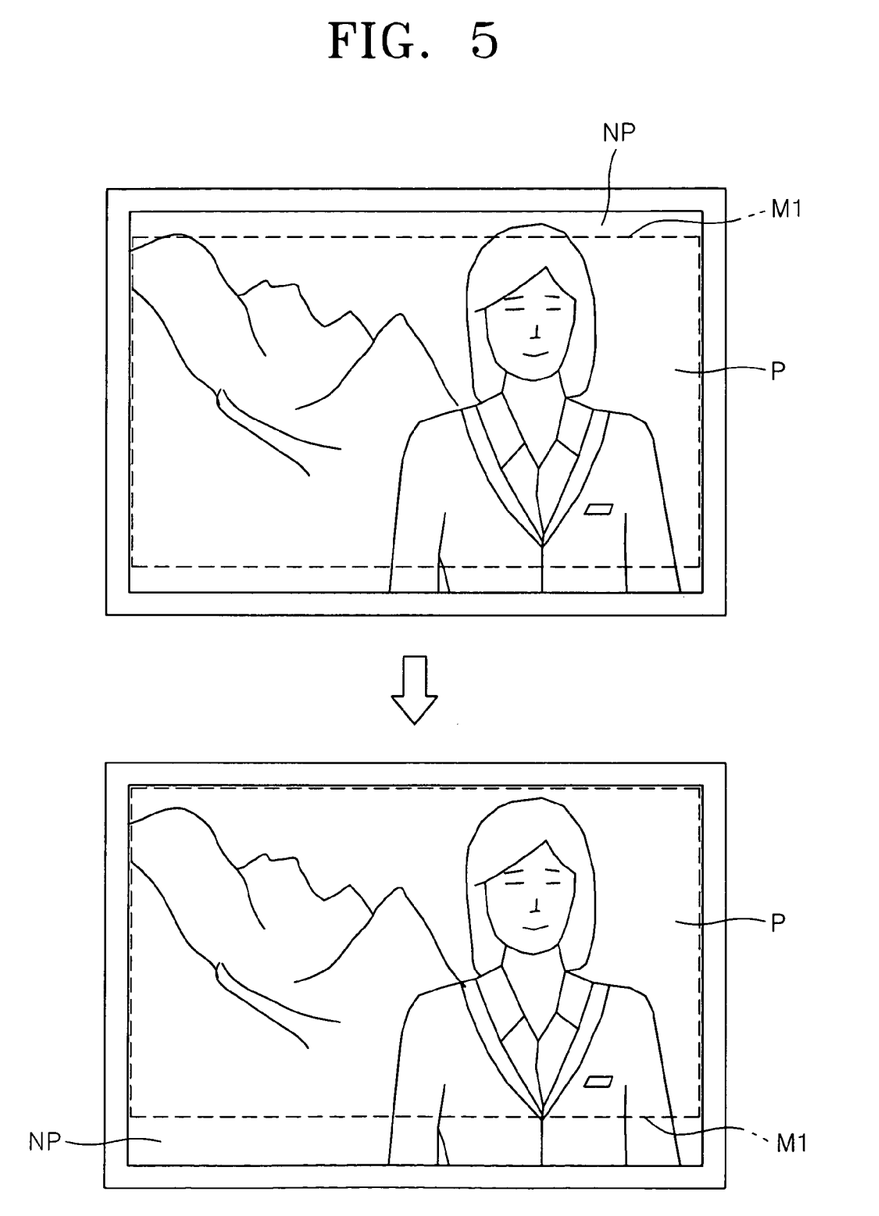
FIG. 5 is a diagram illustrating a print area on an example image, wherein the print area is shown on the example image before and after the print area has been moved, according to an embodiment of the present invention.
Figure 6:
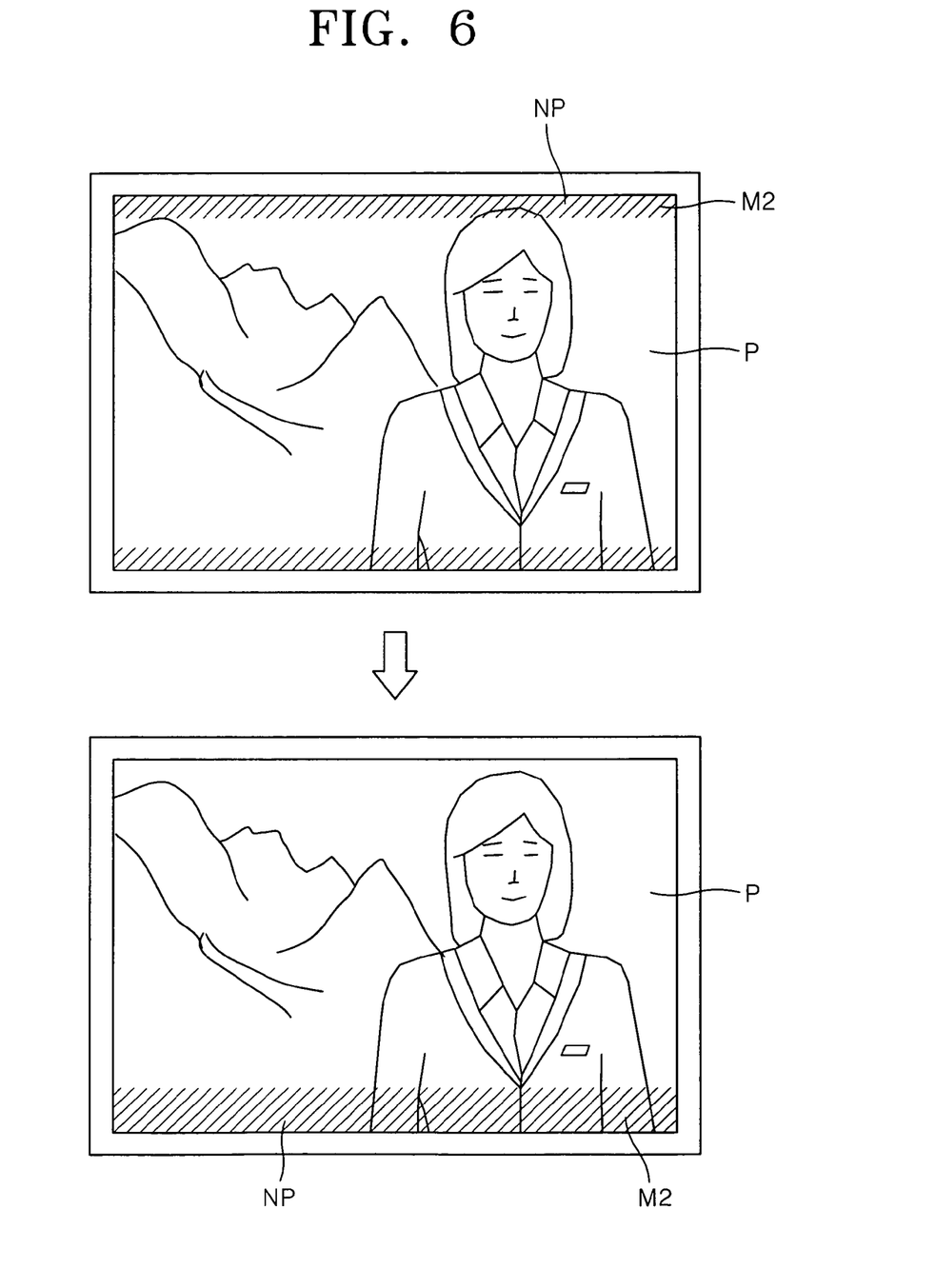
FIG. 6 is a diagram illustrating a print area on an example image, wherein the print area is shown on the example image before and after the print area has been moved, according to an embodiment of the present invention.

The generated print area data is transmitted to the data storage device 120 via the communication control unit 111, and the data storage device 120 provides a preview function related to the print area based on the received print area data (operation S21). To be more specific, as illustrated in FIGS. 5 and 6, based on the received print area data, the data storage device 120 may compose a print area P on an image to be a print target by using a dotted line M1 or a shadow M2, and can thereby display the print area P on the display panel 124. By doing so, the data storage device 120 may provide users with information showing a specific area NP being excluded from a print operation before the print operation is carried out. For example, the print area P may be represented on the image to be the print target as a rectangle frame. As an alternative, it is possible only to display a possible print area from among the entire image to be the print target, excluding parts outside of the print area.

By looking at the print area P of the image, a user may determine whether an important part of the image is excluded from the print area and may move the print area in up, down, left, and right directions, thereby enabling the important part to not be cropped. In this regard, a detailed system operation will now be described. When the processing unit 125 of the data storage device 120 receives from the user interface 123 a signal related to manipulation of a four-direction movement key (operation S22), a movement command related to the print area is generated due to the input signal. The processing unit 125 transmits the generated movement command related to the print area to the photo printer 110 and requests an update of the print area data (operation S20). In response to the received movement command, the print area calculation unit 117 of the photo printer 110 updates and re-transmits the print area data to the data storage device 120, thereby enabling a new print area to be displayed on the display panel 124 due to user manipulation of the four-direction movement key (operation S21).

According to other embodiments, a data storage device 120 such as a digital camera or a computer having a self calculation control function (a CPU function) itself may update print area data in response to receiving a user movement command related to a print area, and display a newly set print area on a display panel 124. In such a case, a processing unit 125 of the data storage device 120 may generate print data comprising an extraction of only a part of an image related to a final print area approved by users and can transmit the print data to a photo printer 110. Meanwhile, a print area calculation unit 117 may be included in the data storage device 120 instead of the photo printer 110. For example, an application program or a printer driver of the data storage device 120 may perform a function of the print area calculation unit 117.

When a signal related to a final print command is input from the user interface 123 (operation S23) and received by the processing unit 125, the processing unit 125 converts image data into print data having a data format capable of being recognized by the photo printer 110, and can thereby transmit the print data to the photo printer 110, according to the input signal directing a print operation. At this time, the processing unit 125 may only extract that part of an image selected as a print target which corresponds to a finally set print area, process the part into the print data, and transmit the print data to the photo printer 110, thereby being capable of reflecting a user setting related to the print area in print conditions. Meanwhile, when the Image Full printing option is selected, similar to operations described above, the processing unit 125 of the data storage device 120 converts image data related to an image into print data having a data format capable of being recognized by the photo printer 110 and transmits the print data to the photo printer 110.

Next, a print operation (operation S24) in the photo printer 110 is started based on the received print data. More specifically, the print data received from the data storage device 120 is temporarily stored in the print data storage unit 118 of the photo printer 110, the printer processor 115 outputs a print start signal to operate the print unit 119, and in correspondence to this, the print unit 119 prints the print data stored in the print data storage unit 118 on a printing material.

Figure 7:
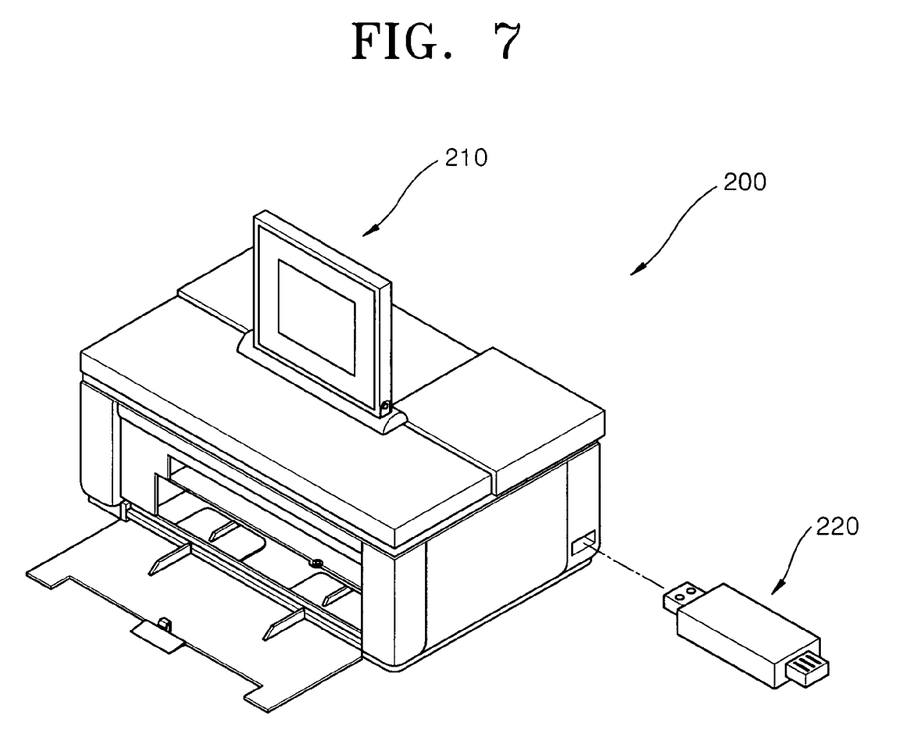
FIG. 7 is a perspective view illustrating a photo-printing system, according to another embodiment of the present invention.

In the method of printing the capture image as described above, the data storage device 120 is assumed to include the processing unit 125 that has a self calculation control function (a CPU function), the user interface 123, and the display panel 124. Examples of such a data storage device 120 may be a digital camera, a mobile telephone, a computer, a digital television (TV), or the like. However, in other embodiments, the data storage device is a small memory device like a detachable memory device such as a memory card that does not contain a CPU function, a user interface, or a display. A formation of a photo-printing system 200 according to such an embodiment is illustrated in FIG. 7.

Figure 8:
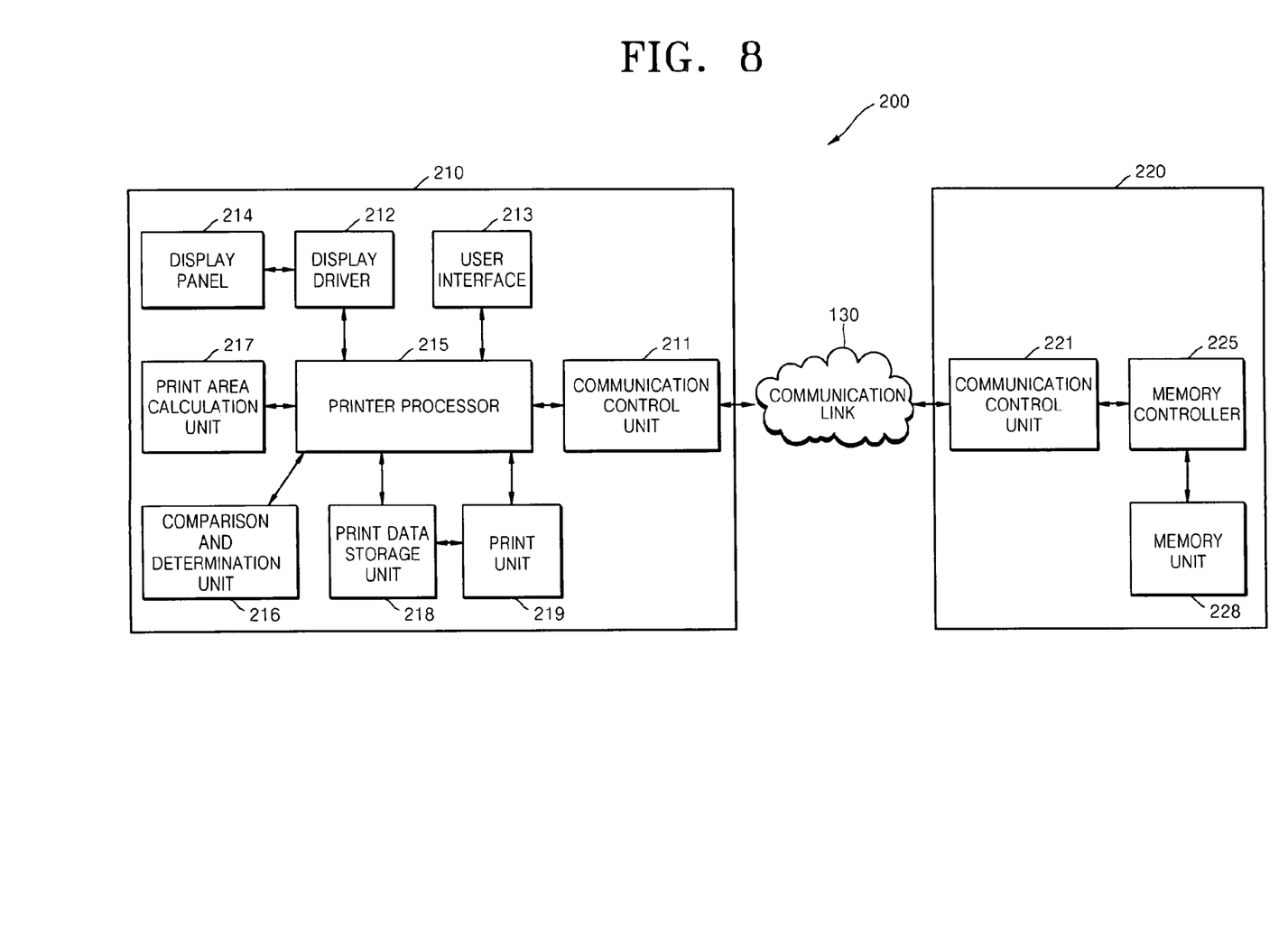
FIG. 8 is a block diagram illustrating an example functional structure of the photo-printing system illustrated in FIG. 7.

The illustrated photo-printing system 200 basically includes a photo printer 210 and a detachable memory device as a data storage device 220. FIG. 8 is a block diagram illustrating an example functional formation of the photo printer 210 and data storage device 220 illustrated in FIG. 7. Referring to FIG. 8, the data storage device 220 is formed to mainly have a function for storing images which may be print targets. The data storage device 220 may include a communication control unit 221 for communicating with the photo printer 210, a memory unit 228 for storing image data for images which may be print targets, and a memory controller 225 for controlling input/output of data related to the memory unit 228.

The photo printer 210 is mutually connected with the data storage device 220 by a communication link 130 such as a USB, or the like. Communication between the photo printer 210 and the storage device 220 also may be wireless, in which case the communication link 130 may not be needed. The photo printer 210 for performing a print operation includes a communication control unit 211, a print data storage unit 218, a print unit 219, a comparison and determination unit 216, a print area calculation unit 217, and a printer processor 215 comprising a CPU or the like for controlling the respective units. In addition, the photo printer 210 may include a display panel 214 and a display driver 212 for displaying an image stored in the data storage device 220. The display panel 214 may be used to select a print target or, where a Paper Full printing option is selected, the display panel 214 may display the print area together with an image in the case so that a user may determine whether he approves of the print area. The user may indicate to the printer processor 215 via a user interface 213 whether he approves of the print area.

The photo-printing system 200 may perform the serial print processing method described in relation to FIG. 4; however, in the photo-printing system 200 of FIG. 8, most of operations of the method are performed by the printer processor 215. To be more specific, when operation power is applied to the photo printer 210 (operation S10), the printer processor 215 is initialized and then performs a print standby mode, and may display an initial screen (operation S11). Next, when connection from the data storage device 220 to a communication interface such as a USB port, a card reader port, or the like is detected (operation S13), the communication control unit 211 generates a communication standby signal. In correspondence with the generated communication standby signal, the printer processor 215 initializes a communication setting with the data storage device 220 (operation S14). At this time, the printer processor 215 may display a folder icon corresponding to the data storage device 220 on the display panel 214 and may display a connection status.

In succession, when a selection signal related to the folder icon corresponding to the data storage device 220 is input from the user interface 213 and received by the printer processor 215, the printer processor 215 retrieves images stored in the data storage device 220 and displays the images on the display panel 214 (operation S15). A user may select a print target from the images displayed on the display panel 214, and the user's selection may be received by the printer processor (operation S16).

Next, when signals corresponding to a setting mode are input from the user interface 213 and received by the printer processor 215, the printer processor 215 performs a user setting mode for setting print conditions according to the input signals (operation S17). The printer processor 215 displays a setting menu screen on the display panel 214, and thereby receives user selection. In the user setting mode, a user's selection related to an Image Full printing option or a Paper Full printing option may be input.

When a signal related to the user's selection of a print option is received by the printer processor 215, the printer processor 215 determines whether the user print option input signal corresponds to the Paper Full printing option (operation S18), and as a result of the determination, performs different procedures. That is, when the Image Full printing option and not the Paper Full printing option is selected, a print standby mode according to operation S23 may be continued, and when a user final print command is input and received, a print operation is performed (operation S24).

On the other hand, when the Paper Full printing option is selected, the comparison and determination unit 216 retrieves information on an aspect ratio of a currently set printing material and information on an aspect ratio of an image selected as a print target and performs a mutual comparison using the information (operation S19). As a result of the comparison, when the ratios between the image and the printing material match with each other, the print standby mode continues according to operation S23 and operations following therefrom. However, when the ratios between the image and the printing material are different from each other, for example, if the ratio of the image selected as the print target is 4:3 while the ratio of the printing material is 3:2, which corresponds to a general A4 paper, operation S20 and operations following therefrom are to be performed.

That is, the printer processor 215 operates the print area calculation unit 217, and thereby calculates location information on a print area based on a current setting, for example, location information on top, bottom, left, and right edges of the print area is calculated (operation S20). Then, the printer processor 215 composes the result of the calculation with the image on the display panel 214 and displays the result (operation S21). The printer processor 215 then waits for a user's approval related to the print area. If manipulation of a four-direction movement key of the user interface 213 is detected, a movement command related to the print area is generated (operation S21). In correspondence with the movement command, the print area calculation unit 217 calculates data related to a new print area, and the printer processor 215 updates the new print area selected by user manipulation and displays the new print area on the display panel 214 (operation S20-S21).

Next, if a signal embodying a final print command is received from the user interface 213 (operation S23), the printer processor 215 generates print data corresponding to a user approved final print area according to the input signal, wherein the user approved final print area is an area of an image selected as a print target. The printer processor 215 temporarily stores the generated print data in the print data storage unit 218 and operates the print unit 219. As an alternative, the printer processor 215 may directly transmit the print data to the print unit 219 without passing through the print data storage unit 218. The print unit 219 performs a reserved print operation on data existing in the print data storage unit 218 and can thereby print a print target image related to the image on a printing material. In the alternative case, the print data storage unit 218 may be omitted.

According to the present invention, when the Paper Full printing option is selected, the methods of printing an image and the photo-printing systems using the methods are provided so as to increase user satisfaction with a printed image by displaying a print area on an image to be a print target such that a user is provided with an opportunity to check the print area and reset the print area before a print operation is performed, so that a part of the image that is considered to be of importance to the user may be arranged so as not to be cropped.

While this invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. A system for printing an image, the system comprising:
   a processor detecting a selection of a paper-full printing mode and controlling operations of the system;
   a comparison and determination unit determining whether an image aspect ratio matches a printing material aspect ratio if the processor detects selection of the paper-full printing mode;
   a print area calculation unit calculating location information of a print area of the image if the comparison and determination unit determines that the image aspect ratio does not match the printing material aspect ratio;
   a display panel displaying the print area calculated by the print area calculation unit;
   a user interface inputting changes to the print area of the image and inputting a final print command; and
   a print unit printing the print area of the image after a final print command has been received.

2. The system of claim 1, wherein the system further comprises a print data storage unit coupled to the print unit.

3. The system of claim 1, wherein the processor determines whether a user has approved the print area displayed on the display panel.

4. The system of claim 1, wherein:
   the processor detects a signal indicating that a change to the print area was input via the user interface and, in response thereto, the print area calculation unit calculates updated location information of the print area, and the display panel displays a new print area.

5. A system for printing an image, the system comprising:
   a data storage device storing images, wherein the data storage device comprises a first housing and a first communication control unit for data communication with a printer;
   a printer capable of receiving image data from the data storage device and printing an image on a printing material, wherein the printer comprises a second housing and a second communication control unit for data communication with the data storage device and a print unit for printing the image;
   a processor for detecting a selection of a paper-full printing mode and controlling the operations of the system;
   a comparison and determination unit determining whether an image aspect ratio matches a printing material aspect ratio if the processor detects the selection of the paper-full printing mode, wherein the comparison and determination unit is coupled to the processor;
   a print area calculation unit, wherein the print area calculation unit is coupled to the comparison and determination unit and calculates location information of the print area if the comparison and determination unit determines that the image aspect ratio does not match the printing material aspect ratio;
   a display panel coupled to the print area calculation unit, wherein the display panel displays the print area calculated by the print area calculation unit; and
   a user interface for changing the print area of the image, wherein the user interface is coupled to the print area calculation unit.

6. The system of claim 5, wherein the processor is within the first housing.

7. The system of claim 5, wherein the processor is within the second housing.

8. The system of claim 5, wherein the comparison and determination unit is within the first housing.

9. The system of claim 5, wherein the comparison and determination unit is within the second housing.

10. The system of claim 5, wherein the print area calculation unit is within the first housing.

11. The system of claim 5, wherein the print area calculation unit is within the second housing.

12. The system of claim 5, wherein the user interface and display panel are coupled to the first housing.

13. The system of claim 5, wherein the user interface and display panel are coupled to the second housing.

14. The system of claim 5, wherein the display panel displays both the print area of the image and portions of the image outside of the print area.

15. The system of claim 5, wherein the print area calculation unit calculates updated location information of the print area if a print area change signal is detected and a new print area is displayed on the display panel.

16. The system of claim 5, wherein the print unit prints the print area of the image after receiving a final print command.

17. The system of claim 5, wherein the data storage device and the printer are connected via a communication link.

18. The system of claim 17, wherein the communication link is an internet communication network.

19. The system of claim 17, wherein the communication link is a communication cable.

20. The system of claim 5, wherein the data storage device is a digital camera which is connected to the printer and has a structure for capturing an image of a subject and storing the captured image as image data.

21. The system of claim 5, wherein the printer is a photo kiosk which is installed at a public place and provides a printing service, and the data storage device is a user's terminal transmitting the stored image to the photo kiosk through an internet communication network.

22. The system of claim 5, wherein the printer is a photo kiosk which is installed at a public place and provides a printing service, and the data storage device is a detachable memory which is connected to the photo kiosk and transmits the stored image to the photo kiosk.

23. A method of printing an image by receiving the image from a data storage device and printing the image via a printer, the method comprising:
   detecting a selection of a paper-full printing option via a user interface;
   if a paper-full printing option is selected, comparing an image aspect ratio with a printing material aspect ratio;

if the image aspect ratio differs from the printing material aspect ratio, calculating location information for a current print area of the image and displaying on a display screen the current print area of the image;

determining whether a new print area of the image has been selected via the user interface;

if a new print area has been selected, calculating updated location information for the new print area and displaying the new print area on the display screen.

24. The method of claim 23, the method further comprising:

determining whether a final print command has been input; and if a final print command has been input, receiving from the data storage device image data corresponding to the new print area of the image and printing the new print area via the print unit.

25. The method of claim 23, wherein the location information comprises at least one piece of location information regarding each of a top edge, a bottom edge, a left edge, and a right edge of the print area.

26. The method of claim 23, wherein the location information comprises a coordinate value for a location of a start point of the print area and coordinate values for a width and height of the print area calculated from the start point.

* * * * *